United States Patent
Kawai et al.

(10) Patent No.: US 10,848,065 B2
(45) Date of Patent: Nov. 24, 2020

(54) POWER CONVERSION DEVICE, POWER CONVERSION SYSTEM, AND POWER CONVERSION DEVICE OPERATION METHOD

(71) Applicant: Mitsubishi Electric Corporation, Chiyoda-ku (JP)

(72) Inventors: Yu Kawai, Chiyoda-ku (JP); Takahiro Kato, Chiyoda-ku (JP)

(73) Assignee: MITSUBISHI ELECTRIC CORPORATION, Tokyo (JP)

(*) Notice: Subject to any disclaimer, the term of this patent is extended or adjusted under 35 U.S.C. 154(b) by 0 days.

(21) Appl. No.: 16/612,641

(22) PCT Filed: Feb. 16, 2018

(86) PCT No.: PCT/JP2018/005405
§ 371 (c)(1),
(2) Date: Nov. 11, 2019

(87) PCT Pub. No.: WO2019/012725
PCT Pub. Date: Jan. 17, 2019

(65) Prior Publication Data
US 2020/0099305 A1 Mar. 26, 2020

(30) Foreign Application Priority Data
Jul. 13, 2017 (JP) .................. 2017-136991

(51) Int. Cl.
*H02M 3/158* (2006.01)
*H02M 7/219* (2006.01)
(Continued)

(52) U.S. Cl.
CPC ........... *H02M 3/1584* (2013.01); *H02J 1/102* (2013.01); *H02J 7/0063* (2013.01); *H02M 3/156* (2013.01);
(Continued)

(58) Field of Classification Search
CPC .... H02M 3/156; H02M 3/158; H02M 3/1584; H02M 7/08; H02M 7/219; H02J 1/102; H02J 2207/20
See application file for complete search history.

(56) References Cited

U.S. PATENT DOCUMENTS

2016/0156262 A1* 6/2016 Kelly ............... H02M 1/00
323/285
2016/0248324 A1* 8/2016 Young .............. H02M 3/158
2019/0334455 A1* 10/2019 Morito ............. H02M 1/08

FOREIGN PATENT DOCUMENTS

| JP | 2010-11567 A | 1/2010 |
| JP | 2015-146699 A | 8/2015 |
| JP | 2016-73099 A | 5/2016 |

OTHER PUBLICATIONS

International Search Report dated Apr. 24, 2018 in PCT/JP2016/005405 filed Feb. 16, 2018.

* cited by examiner

*Primary Examiner* — Emily P Pham
(74) *Attorney, Agent, or Firm* — Xsensus LLP

(57) ABSTRACT

A power conversion device is configured with a plurality of power conversion units multiplexed in parallel each having a power converter for converting a power between a power source and a common load. At least one of the power conversion units is provided with an operation manager for managing the operation of the power converter. The operation manager changes the proportional gain of a voltage adjuster that performs a proportional control by inputting the steady-state offset between a target voltage and a voltage to the load, to determine, by comparing a change in the steady-state offset with a change in the proportional gain, (Continued)

whether the at least one power conversion unit is in a single operation in which the other power conversion units are in no operation.

14 Claims, 14 Drawing Sheets

(51) Int. Cl.
*H02M 3/156* (2006.01)
*H02J 1/10* (2006.01)
*H02M 7/08* (2006.01)
*H02J 7/00* (2006.01)

(52) U.S. Cl.
CPC ............. *H02M 7/08* (2013.01); *H02M 7/219* (2013.01); *H02J 2207/20* (2020.01); *H02M 3/158* (2013.01)

POWER CONVERSION DEVICE, POWER CONVERSION SYSTEM, AND POWER CONVERSION DEVICE OPERATION METHOD

TECHNICAL FIELD

The present application relates to a power conversion device that is configured with power conversion units multiplexed in parallel.

BACKGROUND ARTS

The parallel multiplex configuration of power conversion units receives attention as a design facilitating technology that eliminates the need of a custom design meeting required specifications. In a case of controlling the voltage at the parallel connected ports of a parallel system in which the control functions of power conversion units are independent from each other, a power averaging function is necessary to avoid power concentration to a specific one of the power conversion units (see, for example, Patent Document 1).

PRIOR ART DOCUMENT

Patent Document

Patent Document 1: JP2010-11567 A

SUMMARY OF THE INVENTION

Problem that the Invention is to Solve

Since the switching power supplies disclosed in Patent Document 1, which correspond to the power conversion units, have a drooping characteristic, it is possible to mitigate a problem of concentrating the power to a specific one of the units when they are multiplexed in parallel. However, since it is impossible to detect whether or not one of the units is in a single operation in the parallel multiplexed configuration, stopping some of the units to improve the efficiency is difficult in light of continuous operation, thus requiring for all power conversion units to always output the power.

The present application is made to resolve the above-described problem, and aimed at providing a power conversion device that is configured with parallel multiplexable power conversion units in which one of the power conversion units is able to determine whether or not it is in a single operation without using information from outside the one power conversion unit.

Means for Solving the Problem

A power conversion device disclosed in the present application includes a plurality of power conversion units configured in parallel and connected a load, each power conversion unit having: a power converter configured to convert a power from a power source to a DC power for the load; and a voltage controller provided with a voltage adjuster configured to receive a steady-state offset between a target voltage and a voltage output to the load from the power converter, to perform a proportional control for controlling the voltage to the target voltage, wherein at least one of the plurality of power conversion units has an operation manager configured to manage an operation of the at least one power conversion unit, and the operation manager changes a proportional gain for the proportional control of the voltage adjuster of the at least one power conversion unit to determine whether or not the at least one power conversion unit is in a single operation in which other of the power conversion units except for the at least one power conversion unit are not in operation, by comparing a change in the steady-state offset with a change in the proportional gain.

Advantage Effect of the Invention

A power conversion device disclosed in the present application is configured with a plurality of power conversion units having output ports connected in parallel, and one of the power conversion units is able to determine alone whether or not the one power conversion unit is in the single operation without using information from outside the one power conversion unit.

EMBODIMENTS FOR CARRYING OUT THE INVENTION

Embodiment 1

Figure 1:
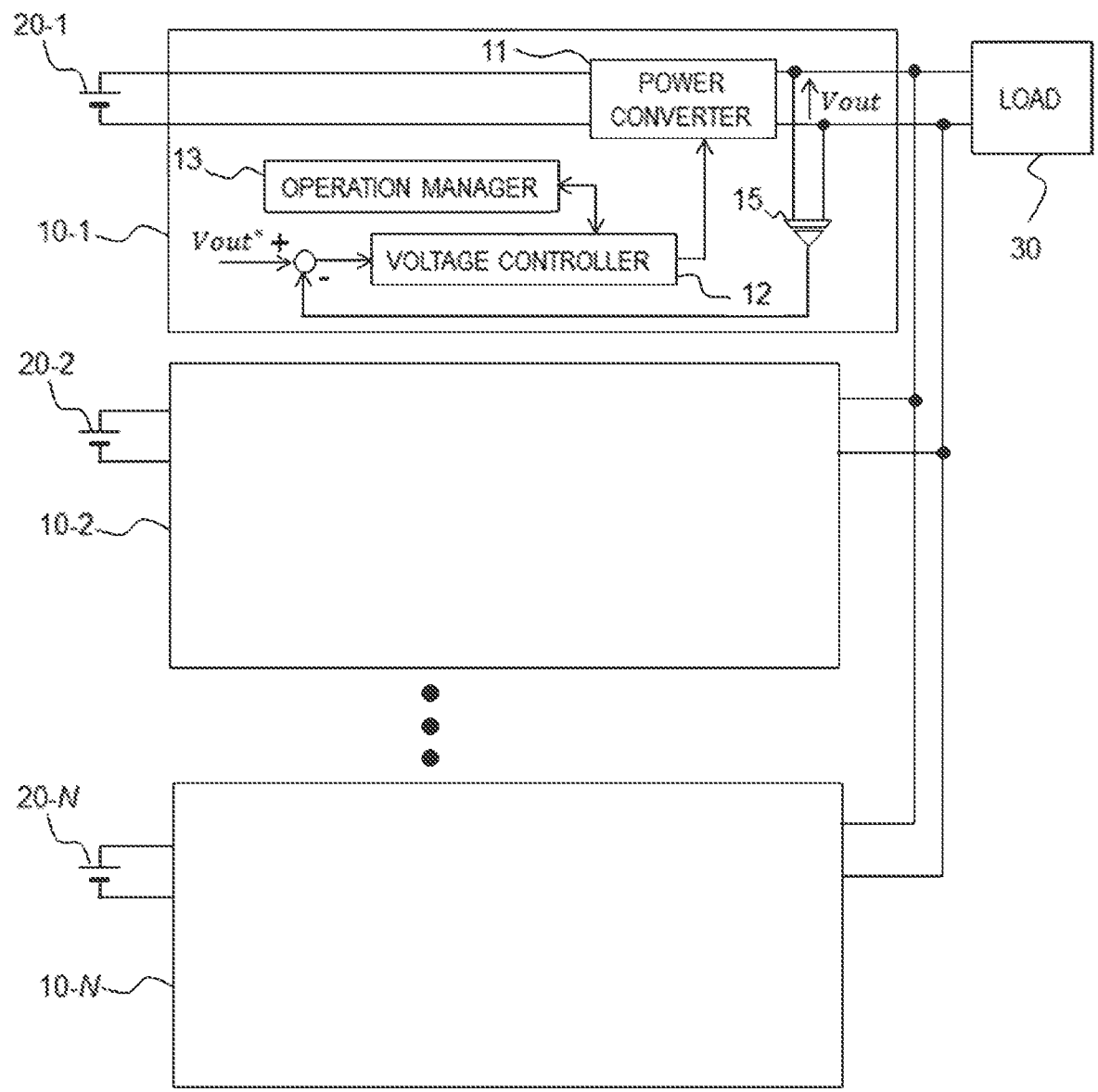
FIG. 1 is a block diagram showing a configuration of a power conversion system including a power conversion device according to Embodiment 1.

FIG. 1 is a block diagram showing a configuration of a power conversion system including a power conversion device according to Embodiment 1. The power conversion device is configured with N power conversion units 10-1, 10-2, ..., 10-N (occasionally, individual power conversion units are representatively referred to as "power conversion units 10"), and each power conversion unit has a power converter 11 to supply power to a common load 30. The power conversion units 10-1, 10-2, ..., 10-N shown in FIG. 1 are configured to receive DC from DC power sources 20-1, 20-2, ..., 20-N, respectively, and to output a DC voltage (DC bus voltage) Vout. In other words, the power converter 11 of each power conversion unit is a DC-DC converter.

Figure 2:
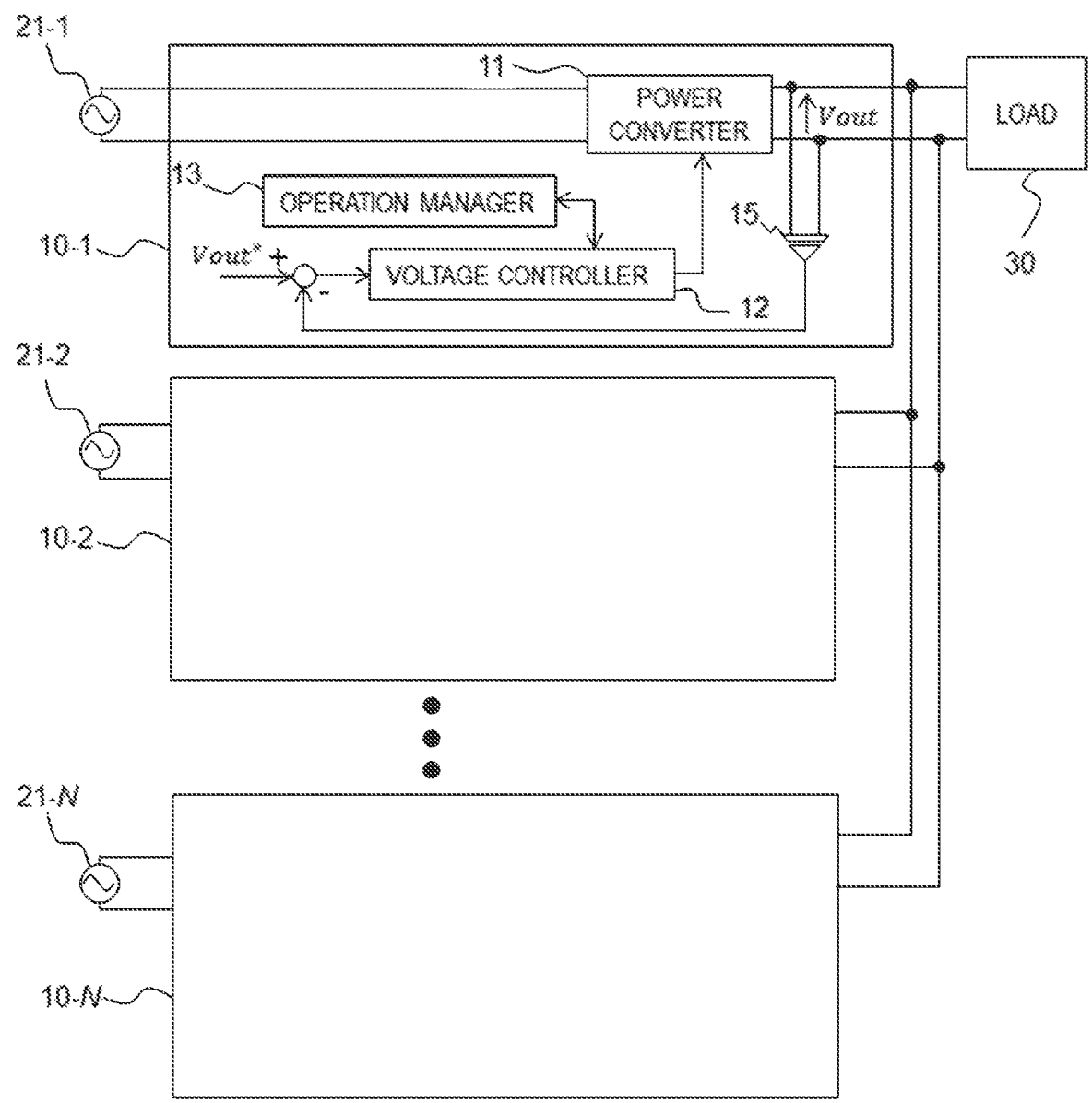
FIG. 2 is a block diagram showing a configuration of the power conversion system including another power conversion device according to Embodiment 1.

FIG. 2 is a block diagram showing a configuration of the power conversion system including another power conversion device according to Embodiment 1. The power conversion device is configured with N power conversion units 10-1, 10-2, ..., 10-N (occasionally, the individual power conversion units are representatively referred to as "power conversion units 10"), and each power conversion unit has a power converter 11 to supply power to the common load 30. The respective power conversion units 10-1, 10-2, ..., 10-N shown in FIG. 2 are configured to receive AC from AC power sources 21-1, 21-2, ..., 21-N and to output the DC voltage (DC bus voltage) Vout. In other words, the power converter 11 of each power conversion unit is an AC-DC converter.

The power conversion units 10 in FIG. 1 and also the power conversion units 10 in FIG. 2 each are provided with a voltage controller 12 for controlling to a target voltage Vout* the DC bus voltage Vout, which is the voltage to the load, detected by a voltage sensor 15 and an operation manager 13 for changing a set value for the voltage controller 12 using the steady-state offset (Vout*−Vout) between the target voltage Vout* and the DC bus voltage Vout. The operation manager 13 has a function of determining whether or not the host power conversion unit is in a single operation on the basis of the set value for the voltage controller 12 and of the steady-state offset.

Figure 14:
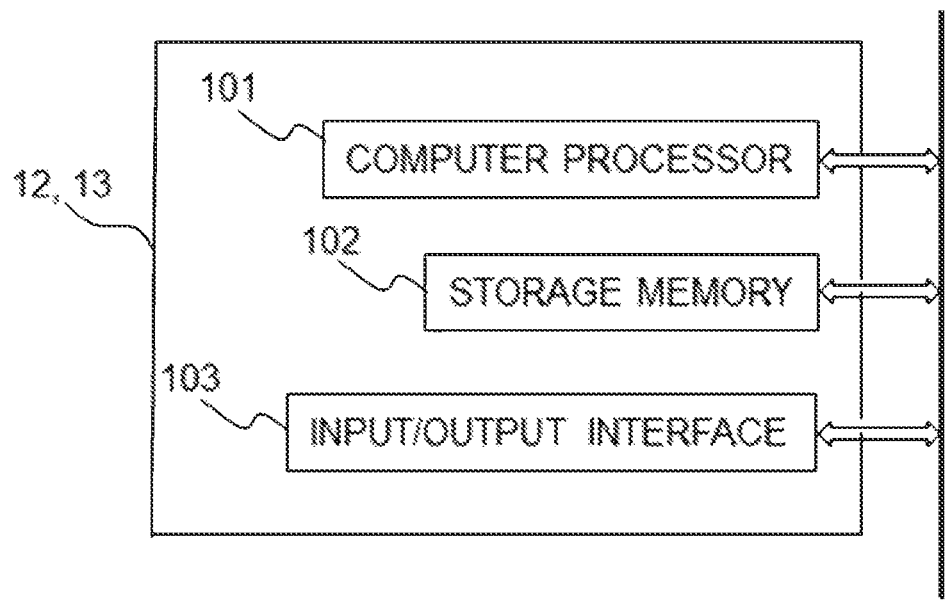
FIG. 14 is a block diagram showing an example of a hardware configuration of the voltage controller and the operation manager of the power conversion device.

To be more specific, the voltage controller 12 and the operation manager 13 are each made up of a computer processor 101 such as a central processing unit (CPU), a storage memory 102 for exchanging data with the computer processor 101, an I/O interface 103 for inputting/outputting signals between the computer processor 101 and the external, and the other components, as shown in FIG. 14. The computer processor 101 may include an application specific integrated circuit (ASIC), an integrated circuit (IC), a digital signal processor (DSP), a field programmable gate array (FPGA), and various types of signal processing circuits. In addition, the voltage controller 12 and the operation manager 13 may be made up of one computer processor 101. In further addition, the computer processor 101 may be replaced with a plurality of processors of the same type or a plurality of processors of different types to share processing of the voltage controller 12 and the operation manager 13. The storage memory 102 has memory devices such as a random access memory (RAM) configured for the computer processor 101 to be able to read data therefrom and write data thereinto and a read only memory (ROM) configured for the computer processor 101 to be able to read data therefrom. The I/O interface 103 is made up of, for example, an A/D converter for inputting to the computer processor 101 the signals output from the voltage sensor 15, a drive circuit for outputting signals to the power converter 11, and the like.

Figure 3:
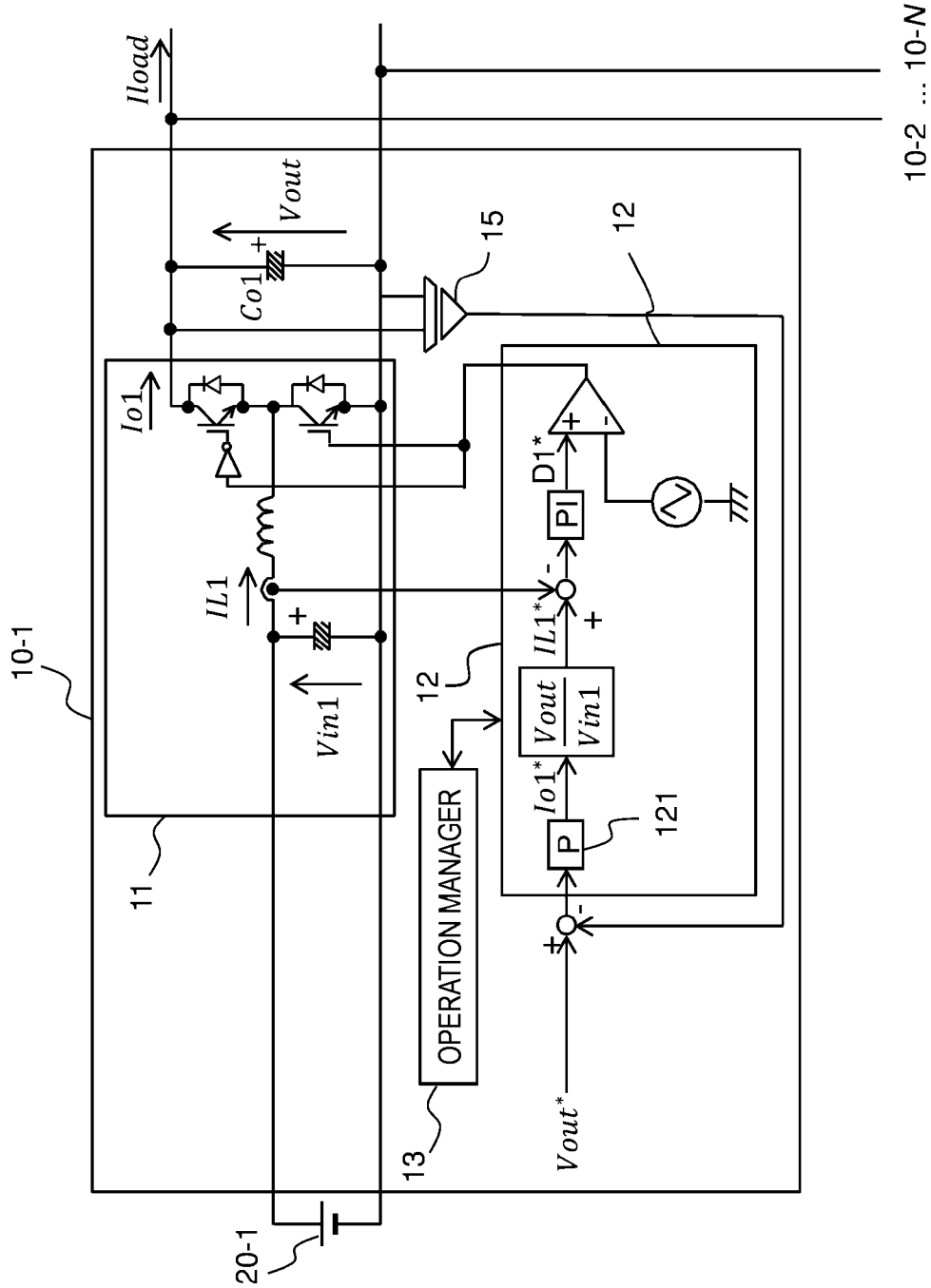
FIG. 3 is a circuit diagram showing an example of a detailed configuration of the power conversion unit shown in FIG. 1.
Figure 4:
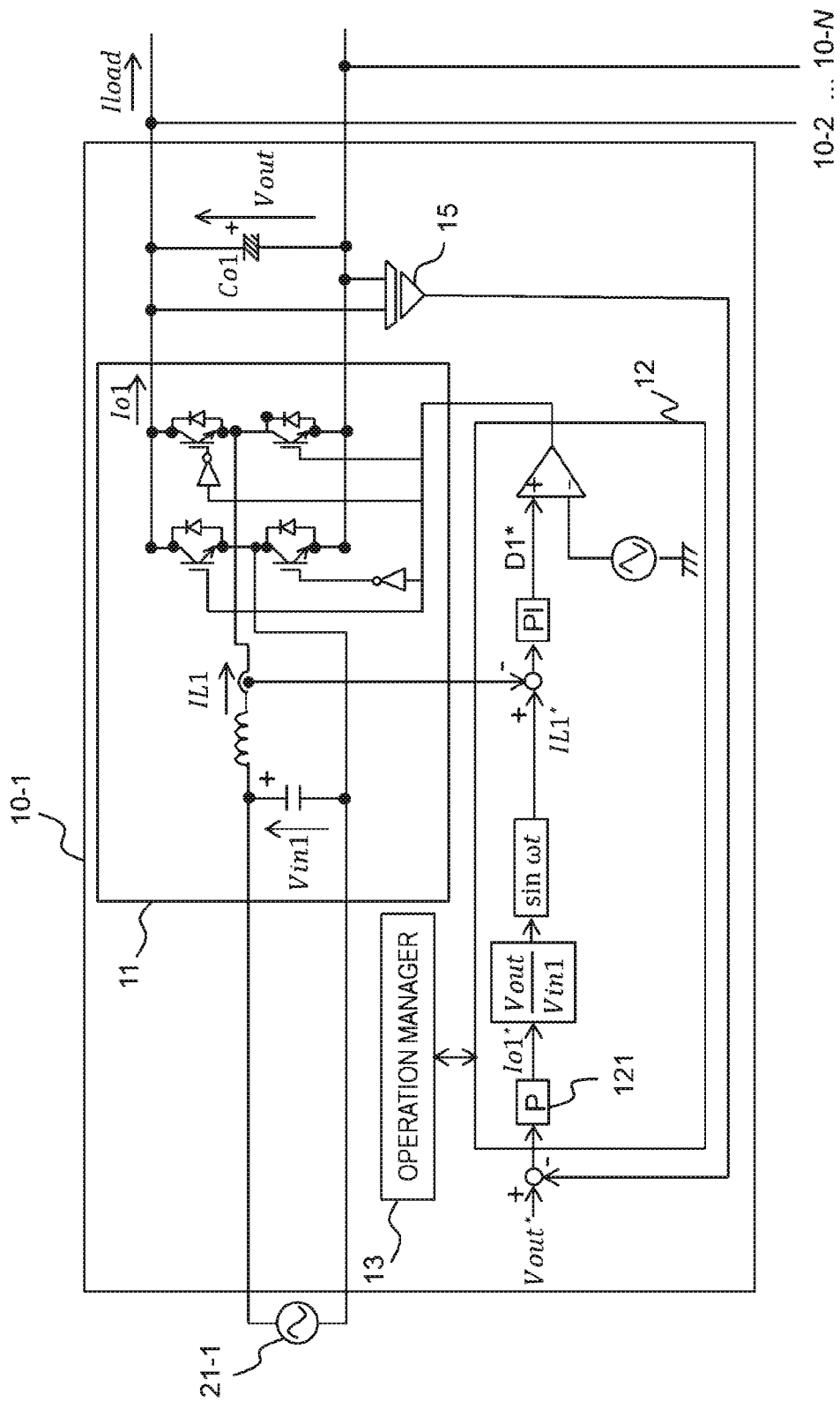
FIG. 4 is a circuit diagram showing an example of a detailed configuration of the power conversion unit shown in FIG. 2.

The configuration and operation of the power conversion units according to Embodiment 1 are described below. FIGS. 3 and 4 are block diagrams respectively showing a specific example of the power converter 11 and the voltage controller 12 shown in FIG. 1 and a specific example of the power converter 11 and the voltage controller 12 shown in FIG. 2.

As shown above, the power converter of each power conversion unit 10 may be the DC-DC converter as shown in FIGS. 1 and 3 or the AC-DC converter as shown in FIGS. 2 and 4, and may further have a mixed configuration such that the power converter 11 of a certain power conversion unit is the DC-DC converter and the power converter 11 of another power conversion unit is the AC-DC converter. The power sources in the input sides of the respective power conversion units may have any configuration, such as a common source or separated sources, or sources common to part of the power conversion units. Moreover, the number N of parallel power conversion units may be any value. Furthermore, the load is not limited to a simple resistive load.

Figure 5:
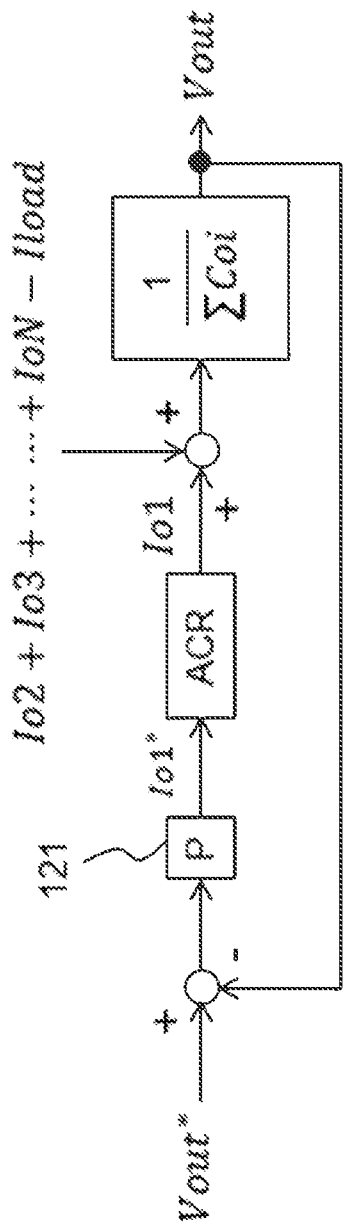
FIG. 5 is a control block diagram schematically showing a control system of the power conversion unit of the power conversion device according to Embodiment 1.

FIG. 5 is a control block diagram schematically showing a control system of each power conversion unit having the configuration shown in FIGS. 3 and 4. The gain of "ACR" shown in FIG. 5, which means simplification of a control system including a current control system, is treated as one in the following description.

The current control system shown in FIGS. 3 and 4 included in a configuration expressed simply as the ARC shown in FIG. 5 is configured to receive a target value Io1* of the DC bus current from a voltage adjuster 121 to control the duty D1 of the power conversion unit so that a target input current value IL1* obtained by converting the target value Io1* of the DC bus current using the ratio between a voltage Vin1 input to the power conversion unit and the DC bus voltage Vout agrees with a detected current value IL1.

Note that the power conversion device disclosed in the present application is feasible for a case where the voltage controller 12 for controlling the DC bus voltage Vout to the target voltage Vout* give a drooping characteristic to the DC bus voltage in response to the output power, and the configuration of the voltage adjuster 121 in the voltage controller 12 is not limited to the configuration for the proportional control (P-control) shown in FIGS. 3 and 4. The voltage adjuster 121 only needs to have a control system that inputs the steady-state offset between the target voltage Vout* and the actual voltage Vout, and performs a proportional control to approximate the steady-state offset to zero by multiplying a value based on the steady-state offset by the proportional gain, irrespective of whether the value has a linearity such as the steady-state offset itself or a non-linearity such as the square or the square root of the steady-state offset.

An operation of the operation manager 13 of Embodiment 1 is described. The description uses the simplified control block diagram shown in FIG. 5. In addition, the voltage adjuster 121 shown in FIG. 5 can be replaced with a control mechanism having a characteristic of changing the steady-state offset (Vout*−Vout) between the target voltage Vout* and DC bus voltage Vout in response to the input power or the output power of the power conversion unit. In further addition, the configuration subsequent to the voltage adjuster 121 is not limited to that shown in FIG. 5.

The operation of the power conversion device disclosed in the present application is based on the an idea that when the gain of the voltage adjuster 121 of the voltage controller 12 of a certain one of the power conversion units is changed, change of the steady-state offset (Vout*−Vout) between the target voltage Vout* and the DC bus voltage Vout will be different between when the one power conversion unit is in the single operation and when the one power conversion unit and the other power conversion units connected in parallel therewith operate in parallel. In the single operation, when the gain is changed, the steady-state offset is changed by an amount corresponding to the gain change. In the parallel operation in which the plurality of power conversion units supply power to the load, however, when the gain of a certain one of the power conversion units changes, the steady-state offset (Vout*−Vout) changes, in association with the gain change, by only less than the change amount corresponding to the gain change because the other power conversion units complement the power. For example, in performing the proportional control for the steady-state offset (Vout*−Vout), when the gain is reduced to half, the steady-state offset increases about two times in the single operation but the steady-state offset change in the parallel operation is smaller than that in the single operation. Thus, by comparing the change in the steady-state offset associated with the gain change with the change in the gain of a certain one of the power conversion units, it is possible to determine whether the one power conversion unit is in the single operation or in the parallel operation with the other power conversion units. However, since the steady-state offset has a very small value, it is conceivable that the determination can be made incorrectly due to a large error even if the value is directly observed. In the following, a method is proposed that facilitates observation of change of the steady-state offset by calculating stable parameters that correspond to the steady-state offset.

The method is described below, taking the configuration of FIG. 5 as an example, that the voltage adjuster 121 performs proportional control for the steady-state offset (Vout*−Vout) itself. First, a description is made of the relationship between a DC bus current Ioi output from one of the power conversion units in association with change of the proportional gain of the voltage adjuster 121 and the steady-state offset between the target voltage Vout* of the DC bus and the actual voltage Vout thereof. In FIG. 5, the relationship between the target voltage Vout* of the DC bus and the actual voltage Vout thereof can be expressed by Eq. (1):

$$\frac{Vout}{Vout^*} = \frac{K}{s + \frac{K}{\sum_{i=1}^{N} Coi}} = \frac{\omega_K}{s + \omega_K}, \tag{1}$$

where K is the proportional gain; Co is a capacity of the output capacitance provided to the output side of each power conversion unit; and Coi denotes the capacity of the output capacitance of the i-th power conversion unit 10-i, and the constant $\omega_K$ is substituted for the terms of the 0-th order of the function s in the denominator and the numerator on the right hand side because it is common to the denominator and the numerator.

Here, attention is paid to the first power conversion unit 10-1. The relationship between the actual voltage Vout and a current disturbance, which is the difference between the summation of output currents (Io2+Io3+ . . . +IoN) of the other power conversion units and a load current Iload, can be expressed by Eq. (2):

$$\frac{Vout}{Io2 + Io3 + \ldots + IoN - Iload} = \frac{\frac{1}{\sum_{i=1}^{N} Coi}}{s + \frac{K}{\sum_{i=1}^{N} Coi}} = \frac{1}{K}\frac{\omega_K}{s + \omega_K}. \tag{2}$$

Referring to FIG. 5, the relationship between the target DC bus voltage Vout* calculated from Eqs. (1), (2) and the actual voltage Vout calculated from the current disturbance, which is the difference between the summation of the output currents of the other power conversion units and the load current, is expressed as Eq. (3):

$$Vout = \frac{\omega_K}{s + \omega_K}\left\{Vout^* + \frac{1}{K}(Io2 + Io3 + \ldots + IoN - Iload)\right\}. \tag{3}$$

Here, an influence of the voltage controllers of the other power conversion units is considered. When all power conversion units have a common proportional gain, Eqs. (1), (2), (3) can be replaced with Eqs. (4), (5), (6), respectively:

$$\frac{Vout}{Vout^*} = \frac{NK}{s + \frac{NK}{\sum_{i=1}^{N} Coi}} = \frac{\omega_{K0}}{s + \omega_{K0}}, \tag{4}$$

$$\frac{Vout}{-Iload} = \frac{\frac{1}{\sum_{i=1}^{N} Coi}}{s + \frac{NK}{\sum_{i=1}^{N} Coi}} = \frac{1}{NK}\frac{\omega_{K0}}{s + \omega_{K0}}, \text{ and} \tag{5}$$

$$Vout = \frac{\omega_{K0}}{s + \omega_{k0}}\left(Vout^* - \frac{1}{NK}Iload\right), \tag{6}$$

where the constant $\omega_{K0}$ is substituted for terms of the 0-th order of the function s in the denominator and the numerator on the right hand sides because it is common to the denominator and the numerator.

Since the value of $\omega_{K0}/(s+\omega_{K0})$ is one in the steady state, in a situation of the load being considered as a constant resistive load R, the relationship obtained from Eq. (6) is expressed as Eq. (7):

$$R = \frac{Vout}{Iload} = \frac{Vout^*}{Iload} - \frac{1}{NK}. \tag{7}$$

Furthermore, in a situation of the load being considered as a constant power load, the relationship obtained from Eq. (6) is expressed for the power P as Eq. (8):

$$P = Vout \cdot Iload = Vout^* \cdot Iload - \frac{1}{NK}Iload^2. \tag{8}$$

Note that a load to which the power conversion device disclosed in the present application is applicable only needs to be a load that can be simulated as a constant resistive load or a constant power load by being time averaged even though it is a non-linear load causing an instantaneous power change. Thus, the load is not limited to a constant resistive load pr a constant power load with no time variation. Furthermore, the load may have a power generation function, as described in Embodiment 3. The following description is made by assuming that the load can be simulated as a constant resistive load or a constant power load by being time averaged. Hence, the load is referred to as a constant resistive load or a constant power load in the description.

Each power conversion unit is able to estimate the load using the detected DC bus voltage Vout of the target DC-bus current value Io1* generated by the voltage adjuster 121 in the voltage controller 12 of the host power conversion unit. To be more specific, by considering that the target DC-bus current value Io1* generated by the voltage adjuster 121 will be the current from the power conversion unit to the load, the resistance value can be estimated for when the load can be simulated as a constant resistive load or the power can be estimated for when the load can be simulated as a constant power load. Eq. (9) is an estimating equation for calculating the estimated resistance value Rx in the case of the constant resistive load, and Eq. (10) is an estimating equation for calculating the estimated power value Px in the case of the constant power load.

$$Rx = \frac{Vout}{Io1^*} = \frac{Vout}{K(Vout^* - Vout)} \text{ and} \qquad (9)$$

$$Px = Vout \cdot Io1^* = Vout \cdot K(Vout^* - Vout). \qquad (10)$$

In the following, a description is made of a principle of a method of determining the operation to be single using the actual relationship of the load characteristics shown by Eqs. (7), (8) and the estimating equations shown by Eqs. (9), (10). While the description is made using configurations with one power conversion unit (single operation) and with three power conversion units, no limitation is imposed to the number of parallel power conversion units.

Figure 6:
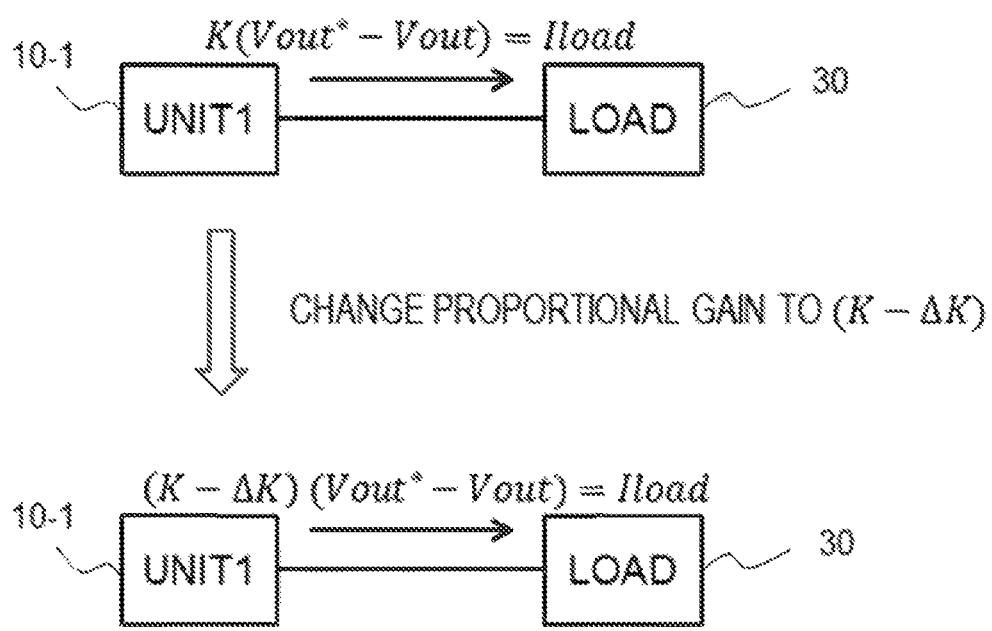
FIG. 6 is a schematic diagram for explaining an operation of the power conversion device according to Embodiment 1 when one of the power conversion units is in the single operation.
Figure 7:
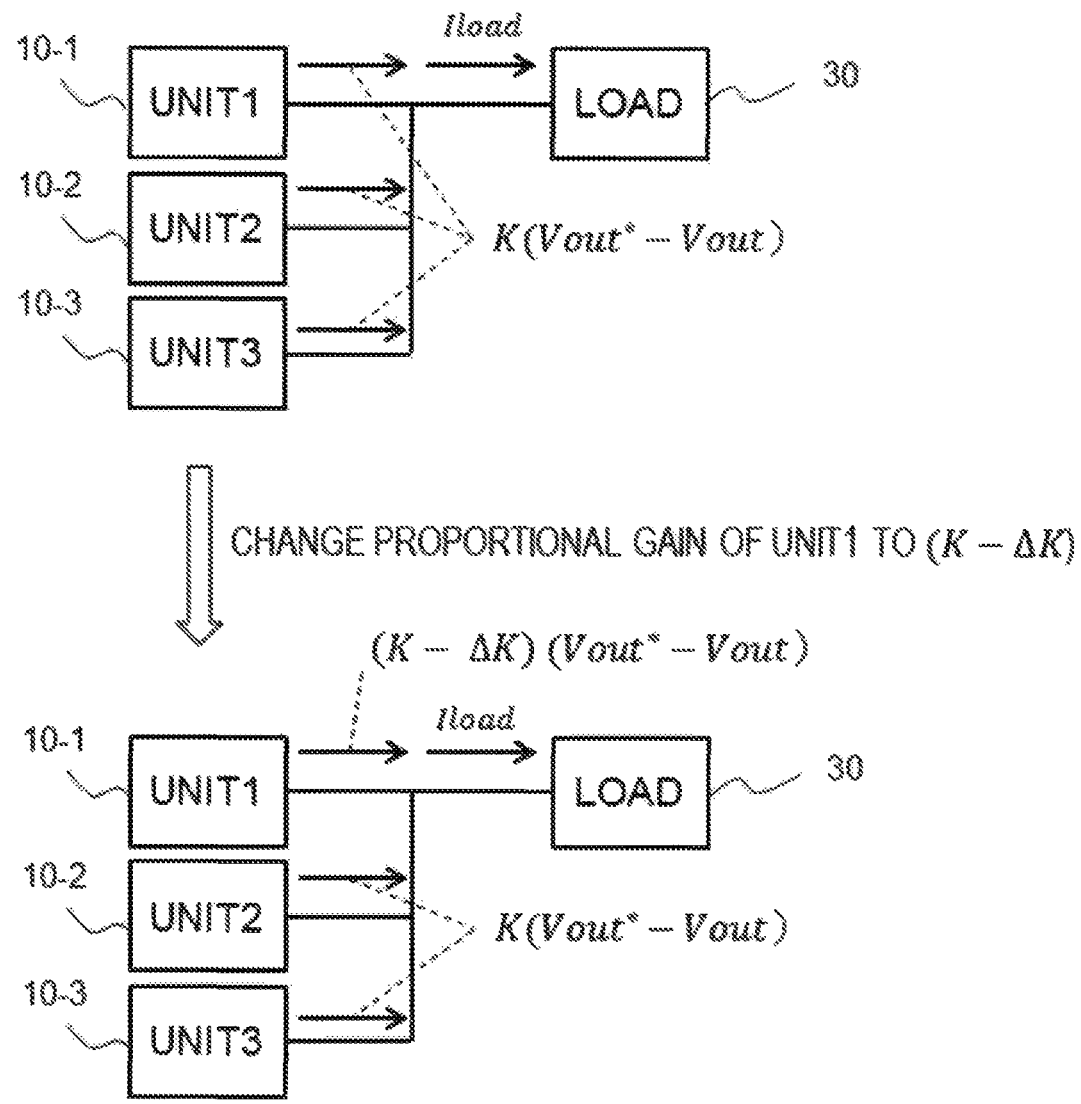
FIG. 7 is a schematic diagram for explaining an operation of the power conversion device according to Embodiment 1 when some of the power conversion units are in the parallel operation.

FIG. 6 is a diagram schematically showing the single operation of the one power conversion unit and FIG. 7 is a diagram schematically showing the parallel operation of the three power conversion units. In the single operation, a relationship corresponding to Eq. (6) is expressed as Eq. (11):

$$Vout = \frac{\omega_{K0}}{s + \omega_{K0}}\left(Vout^* - \frac{1}{K}Iload\right). \qquad (11)$$

Further, in the three-unit parallel operation, a relationship corresponding to Eq. (6) is expressed as Eq. (12):

$$Vout = \frac{\omega_{K0}}{s + \omega_{K0}}\left(Vout^* - \frac{1}{3K}Iload\right). \qquad (12)$$

When the proportional gain of the voltage adjuster 121 of the one power conversion unit is changed and reduced from K to (K−ΔK), Eqs. (11), (12) can be expressed as Eqs. (13), (14), respectively:

$$Vout = \frac{\omega_{K0}}{s + \omega_{K0}}\left(Vout^* - \frac{1}{K - \Delta K}Iload\right) \text{ and} \qquad (13)$$

$$Vout = \frac{\omega_{K0}}{s + \omega_{K0}}\left(Vout^* - \frac{1}{3K - \Delta K}Iload\right). \qquad (14)$$

For the case of the constant resistive load in the steady state, resistance estimating equations corresponding to Eqs. (11), (12) for the single operation are expressed as Eqs. (15), (16), respectively:

$$Rx = \frac{Vout}{K(Vout^* - Vout)} = \frac{Vout}{Iload} \text{ and} \qquad (15)$$

$$Rx = \frac{Vout}{(K - \Delta K)(Vout^* - Vout)} = \frac{Vout}{Iload}. \qquad (16)$$

Further, power estimating equations for the constant power load are expressed as Eqs. (17), (18), respectively:

$$Px = Vout \cdot K(Vout^* - Vout) = Vout \cdot Iload \qquad (17) \text{ and}$$

$$Px = Vout \cdot (K - \Delta K)(Vout^* - Vout) = Vout \cdot Iload \qquad (18)$$

Thus, it is found that in the single operation, when the load can be simulated as a constant resistive load, the load takes the same estimated resistance value before and after the proportional gain is changed by ΔK; or when the load can be simulated as a constant power load, the load takes the same estimated power value before and after the proportional gain is changed by ΔK In the single operation, with the change ratio (K−ΔK)/K of the proportional gain, the quotient (Vout*−Vout)/Vout of the steady-state offset and the DC bus voltage for the constant resistive load, and the product (Vout*−Vout)·Vout of the steady-state offset and the DC bus voltage for the constant power load, are changed K/(K−ΔK) times, which is the inverse of the proportional gain change ratio. Consequently, the load estimation calculated from Eqs. (9), (10) have the same value before and after the proportional gain is changed.

In contrast to this, constant resistive load estimating equations corresponding to Eqs. (12), (14) for the three-unit parallel operation are expressed as Eqs. (19), (20):

$$Rx = \frac{Vout}{K(Vout^* - Vout)} = 3\frac{Vout}{Iload} \text{ and} \qquad (19)$$

$$Rx = \frac{Vout}{(K - \Delta K)(Vout^* - Vout)} = \frac{3K - \Delta K}{K - \Delta K}\frac{Vout}{Iload}. \qquad (20)$$

Further, constant power load estimating equations are expressed as Eqs. (21), (22):

$$Px = Vout \cdot K(Vout^* - Vout) = Vout \cdot \frac{Iload}{3} \text{ and} \qquad (21)$$

$$Px = Vout \cdot (K - \Delta K)(Vout^* - Vout) = Vout \cdot \frac{K - \Delta K}{3K - \Delta K}Iload. \qquad (22)$$

Thus, it is found that in the three-unit parallel operation, the constant resistive load or the constant power load takes different estimated values before and after the proportional gain is changed by ΔK As described above, with the change ratio (K−ΔK)/K of the proportional gain in the single operation, the quotient (Vout*−Vout)/Vout of the steady-state offset and the DC bus voltage for the constant resistive load, and the product (Vout*−Vout)·Vout of the steady-state offset and the DC bus voltage for the constant power load, are changed K/(K−ΔK) times, which is the inverse of the change ratio of the proportional gain. Consequently, the load estimation calculated from Eqs. (9), (10) have the same value before and after the proportional gain is changed. In the parallel operation, on the other hand, with the change ratio (K−ΔK)/K of the proportional gain, the quotient (Vout*−Vout)/Vout of the steady-state offset and the DC bus voltage for the constant resistive load, and the product (Vout*−Vout)·Vout of the steady-state offset and the DC bus voltage for the constant power load, are changed differently from K/(K−ΔK) times, which is the inverse of the change ratio of the proportional gain. Consequently, the load estimation calculated from Eqs. (9), (10) takes different values before and after the proportional gain is changed. For example, when ΔK is set at half of the original proportional gain, the estimated value calculated from Eq. (19) is ⅗ times smaller than that calculated from Eq. (20) and the estimated value calculated from Eq. (21) is 5/3 times larger than that calculated from Eq. (22). In this way, whether the operation is single or parallel can be determined using the load estimating equation (9) or (10). To be more specific, whether the operation is single or parallel can be determined by calculating the estimated resistance value Rx from Eq. (9) for the constant resistive load or the estimated power value Px from Eq. (10) for the constant power load, using the DC bus voltage Vout of the one power conversion unit and Io1* output from the voltage adjuster 121.

The above showed that it is possible to determine whether the operation is single or parallel by comparing the change in the estimated value of the load with the change in the proportional gain. As described above, comparing the change in the estimated resistance value for the constant resistive load with the change in the proportional gain is equivalent to comparison between the change in (Vout*−Vout)/Vout and the change in the proportional gain. Similarly, comparing the change in the estimated power value for the constant power load with the change in the proportional gain is equivalent to comparison between the change in (Vout*−Vout)/Vout and the change in the proportional gain. The ratio of the change in Vout here is small compared to the ratio of the change in the steady-state offset (Vout*−Vout) in association with the change in the proportional gain. Thus, comparing the change in the estimated value of the load with the change in the proportional gain substitutes for comparison between the change in the steady-state offset (Vout*−Vout) and the change in the proportional gain.

Next, a description is made on that the determination whether the operation is single or parallel can be made similarly for a case of the proportional gains of the voltage adjusters 121 of all power conversion units being different from each other. Eqs. (23), (24), (25), which respectively correspond to Eqs. (1), (2), (3), are relational equations for the case of the proportional gains of the voltage adjusters 121 of the power conversion units being different from each other.

$$\frac{Vout}{Vout^*} = \frac{\sum_{i=1}^{N} Ki}{s + \frac{\sum_{i=1}^{N} Ki}{\sum_{i=1}^{N} Coi}} = \frac{\omega_{KN}}{s + \omega_{KN}}, \quad (23)$$

$$\frac{Vout}{-Iload} = \frac{\frac{1}{\sum_{i=1}^{N} Coi}}{s + \frac{\sum_{i=1}^{N} Ki}{\sum_{i=1}^{N} Coi}} = \frac{1}{\sum_{i=1}^{N} Ki} \frac{\omega_{KN}}{s + \omega_{KN}}, \text{ and} \quad (24)$$

$$Vout = \frac{\omega_{KN}}{s + \omega_{KN}} \left( Vout^* - \frac{1}{\sum_{i=1}^{N} Ki} Iload \right), \quad (25)$$

where the constant $\omega_{KN}$ is substituted for terms of the 0-th order of the function s in the denominator and the numerator on the right hand sides of because it is common to the denominator and the numerator.

Figure 8:
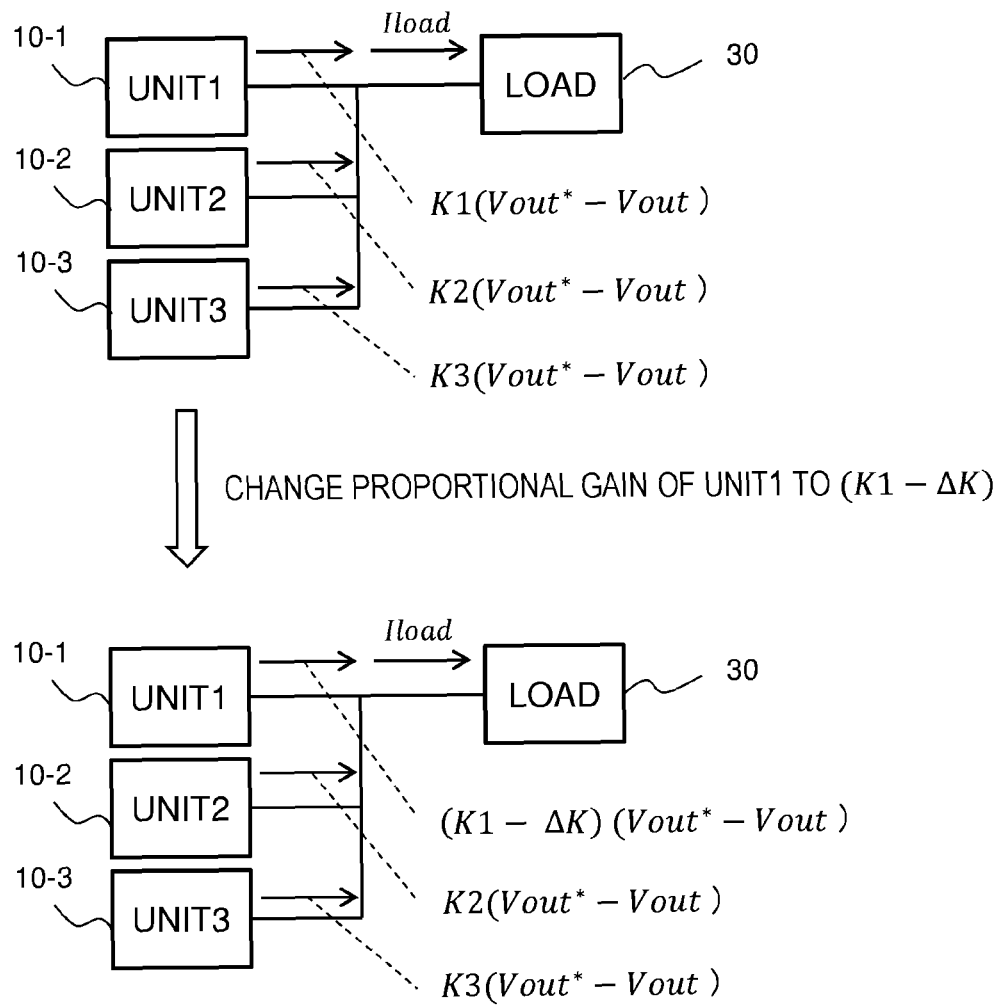
FIG. 8 is a schematic diagram for explaining another operation of the power conversion device according to Embodiment 1 when some of the power conversion units are in the parallel operation.

As with the previous description, the description is made using FIG. 6 schematically illustrating the single operation of the one power conversion unit and FIG. 8 schematically illustrating the parallel operation of the three power conversion units. A relation corresponding to the Eq. (6) for the single operation and a relation corresponding to the Eq. (6) for the three-unit parallel operation are expressed as Eqs. (26) and (27):

$$Vout = \frac{\omega_{KN}}{s + \omega_{KN}} \left( Vout^* - \frac{1}{K_1} Iload \right) \text{ and} \quad (26)$$

$$Vout = \frac{\omega_{KN}}{s + \omega_{KN}} \left( Vout^* - \frac{1}{K_1 + K_2 + K_3} Iload \right). \quad (27)$$

When the proportional gain of the voltage adjuster 121 of one of the power conversion units is reduced by ΔK, Eqs. (26), (27) are expressed as Eqs. (28), (29), respectively:

$$Vout = \frac{\omega_{KN}}{s + \omega_{KN}} \left( Vout^* - \frac{1}{K_1 - \Delta K} Iload \right) \text{ and} \quad (28)$$

$$Vout = \frac{\omega_{KN}}{s + \omega_{KN}} \left( Vout^* - \frac{1}{K_1 - \Delta K + K_2 + K_3} Iload \right). \quad (29)$$

For the case of the constant resistive load in the steady state, resistance estimating equations corresponding Eqs. (26), (28) for the single operation are expressed as Eqs. (30), (31), respectively:

$$Rx = \frac{Vout}{K_1(Vout^* - Vout)} = \frac{Vout}{Iload} \text{ and} \quad (30)$$

$$Rx = \frac{Vout}{(K_1 - \Delta K)(Vout^* - Vout)} = \frac{Vout}{Iload}. \quad (31)$$

Further, the power estimating equations for the constant power load are expressed as Eqs. (32), (33):

$$Px = Vout \cdot K_1(Vout^* - Vout) = Vout \cdot Iload \quad (32)$$

and $$Px = Vout \cdot (K_1 - \Delta K)(Vout^* - Vout) = Vout \cdot Iload. \quad (33)$$

Thus, it is found that in the single operation, the constant resistive load or the constant power load takes the same estimated value before and after the proportional gain is changed by $\Delta K$.

In contrast to this, constant resistive load estimating equations corresponding to Eqs. (27), (29) for the three-unit parallel operation are expressed as Eqs. (34), (35), respectively:

$$Rx = \frac{Vout}{K_1(Vout^* - Vout)} = \frac{K_1 + K_2 + K_3}{K_1} \frac{Vout}{Iload} \text{ and} \quad (34)$$

$$Rx = \frac{Vout}{(K_1 - \Delta K)(Vout^* - Vout)} = \frac{K_1 - \Delta K + K_2 + K_3}{K_1 - \Delta K} \frac{Vout}{Iload}. \quad (35)$$

Further, constant power load estimating equations are expressed as Eqs. (36), (37):

$$Px = Vout \cdot K_1(Vout^* - Vout) = Vout \cdot \frac{K_1}{K_1 + K_2 + K_3} Iload, \text{ and} \quad (36)$$

$$Px = \quad (37)$$
$$Vout \cdot (K_1 - \Delta K)(Vout^* - Vout) = Vout \cdot \frac{K_1 - \Delta K}{K_1 - \Delta K + K_2 + K_3} Iload.$$

As shown above, also in the case of the proportional gains of the voltage adjusters 121 of all power conversion units being different from each other, it is found that in the three-unit parallel operation, the constant resistive load or the constant power load takes different estimated values before and after the proportional gain of the voltage adjuster 121 of the one power conversion unit is changed by $\Delta K$, as with the case of the common proportional gain.

From the above description, it is found that determination whether the operation is single or parallel can be made by changing the proportional gain to calculate the estimated resistance values or the estimated power values of the load before and after the proportional gain is changed and by comparing the change in the estimated value of the load with the change in the proportional gain. Since comparing the change in the estimated value of the load with the change in the proportional gain substitutes, as described above, for comparison between the change in the steady-state offset and the change in the proportional gain, the comparison between the change in the steady-state offset and the change in the proportional gain is equivalent to the determination of whether the operation is single or parallel.

Figure 9:
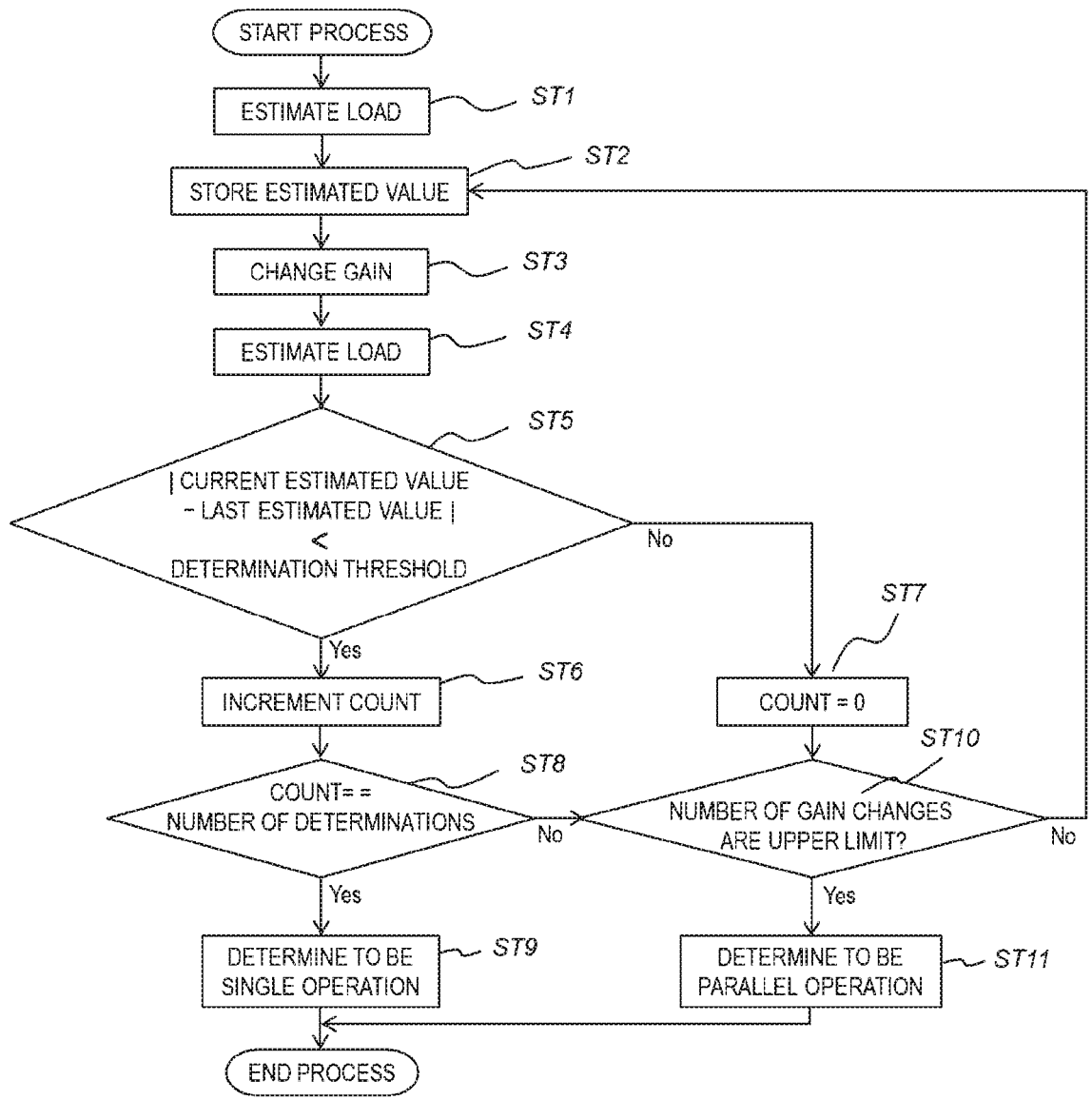
FIG. 9 is a flowchart for explaining the operation of the power conversion device according to Embodiment 1.

A method is described that actually enables the determination of whether the operation is single using the principle of the above-described method of determining the single operation. FIG. 9 is a flowchart for implementing the determination of whether the operation is single and shows an operation of the operation manager 13. The start timing of the process shown by the flowchart of FIG. 9 can be set arbitrarily. After the process is started, the load is estimated (Step ST1) using Eq. (9) or Eq. (10), i.e., using the DC bus voltage Vout and the target current value Io1* output from the voltage adjuster 121, and then the estimated value is stored (Step ST2). In the estimation of the load (Step ST1), the estimation may be made in accordance with the characteristic of the load: when the load can be simulated as a constant resistive load, the estimated resistance value Rx of the constant resistive load is calculated or when the load can be simulated as a constant resistive load, the estimated power value Px of the constant power load is calculated, or when the load can be simulated as either the constant resistive load and the constant power load, at least one of either values is calculated. After that, the proportional gain of the voltage adjuster 121 is changed (Step ST3), to estimate the load (Step ST4). After the proportional gain is changed, the difference is taken between the last estimated value and the current estimated value (Step ST5). If the difference is smaller than a preset value ("Yes" in Step ST5), the count is incremented (Step ST6) or if the difference is equal to or larger than the preset value, the count is reset (Step ST7). In the case of incrementing the count, if the count reaches a number of determinations ("Yes" in Step ST8), the operation is determined to be single (Step ST9). When the operation is determined to be single, the process ends. When the count is reset (Step ST7) or when the count not reach the number of determinations ("No" in Step ST8) and the number of gain changes does not reach a preset upper limit ("No" in Step ST10), the process returns to Step ST2 to store the estimated value. Then, the process is executed from Step ST3 of changing the gain. In this way, the gain change is repeated until the operation is determined to be single (Step ST9) or to be parallel (Step ST11) when the number of gain changes reaches an upper limit ("Yes" in Step ST10). Note that the gain is changed here in such a manner that it is reduced by $\Delta K$ from the initial gain setting K in the first round, i.e., the gain is set at (K-$\Delta K$). In the second round, the gain having been (K-$\Delta K$) is returned to K. In the third round, the gain is set at (K-$\Delta K$) again. In this way, the gain change is repeated with the gain being changed alternately to K and (K-$\Delta K$).

The reason why the operation is determined to be single when the absolute value of the difference between the current estimated value and the last estimated value is small and when the count incremented by multiple changes of the gain reaches the number of determinations, is for preventing an error in the determination that the operation is single, due to a transient variation or an overlap of the process timing with that timing of the other power conversion units.

The process may be started at an arbitrary timing, but is preferably executed at fixed intervals. For example, unit numbers are assigned to the respective power conversion units and the process is started at periodic timings in order of the unit numbers so that the processing periods of the power conversion units are different from each other, whereby overlap between the process timings of the power conversion units can be prevented.

As described above, each power conversion unit of the power conversion device according to Embodiment 1 is able to determine that it is in the single operation by comparing change in the steady-state offset with change in the gain change when changing its gain alone without obtaining information from the other power conversion units during the single operation, i.e., the other power conversion units are not connected in parallel or the other parallel-connected power conversion units pause their power conversion operations.

Note that in the plurality of power conversion units having the output ports connected in parallel, the operation manager 13 for determining whether the operation is single or parallel may not be provided to all power conversion units but may be provided to at least one of the power conversion units.

Embodiment 2

Embodiment 2 proposes an improvement of efficiency of the power conversion device for the case of the parallel operation of the plurality of power conversion units using the single operation determining method described in Embodiment 1. The whole system of a power conversion device according to Embodiment 2 has the same configuration as those shown in FIGS. 1 to 4. Note that the operation manager 13 according to Embodiment 2 includes an operation added for the efficiency improvement, compared to the operation of the operation manager 13 according to Embodiment 1.

Figure 10:
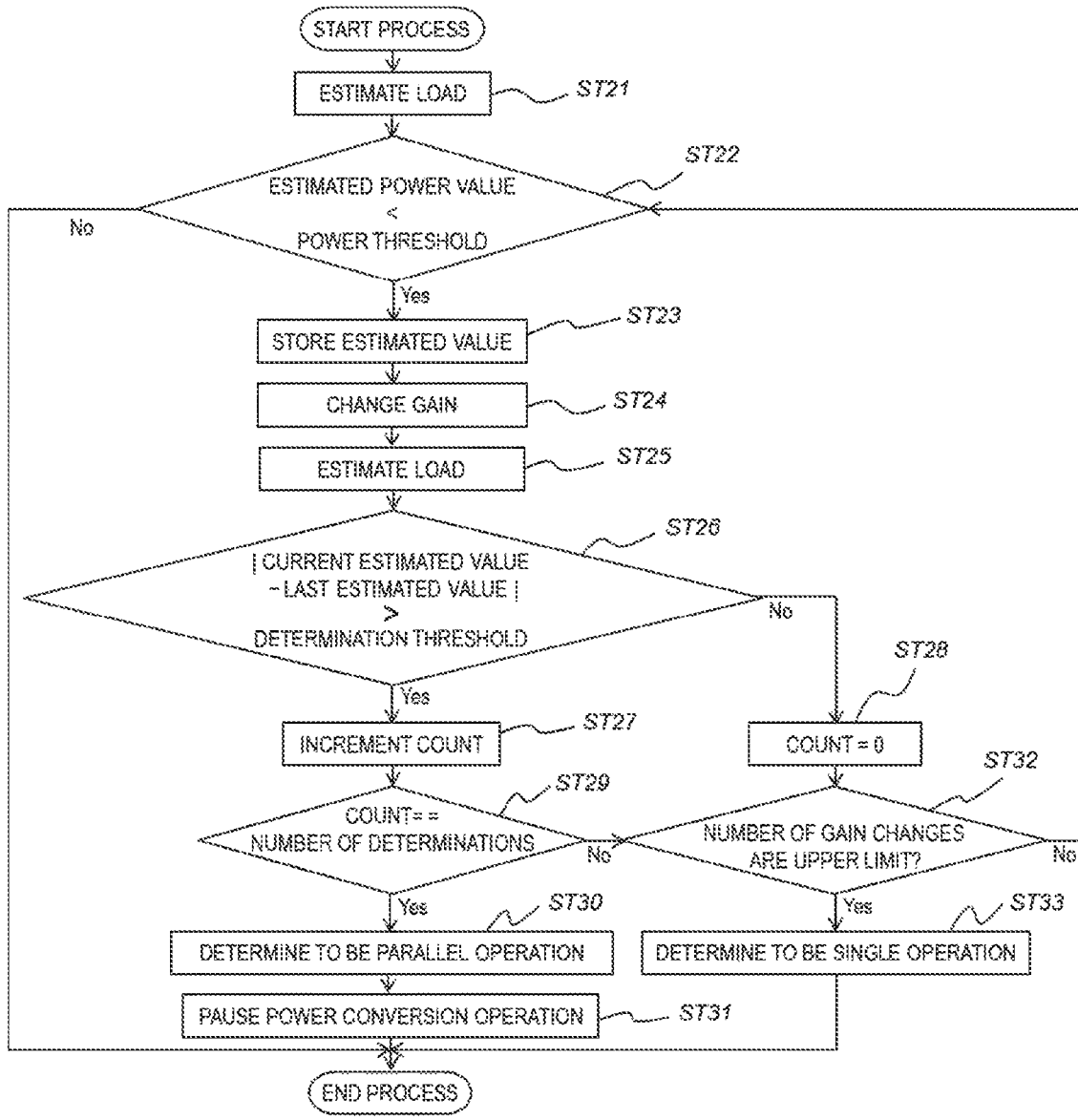
FIG. 10 is a flowchart for explaining an operation of a power conversion device according to Embodiment 2.

In the following, the operation of each power conversion unit according to Embodiment 2 is described with reference to FIG. 10 showing the exemplary flowchart of the efficiency improvable operation of the operation manager 13 of the host power conversion unit provided with the voltage adjuster 121 shown in FIG. 5 and FIGS. 11 and 12 for explaining the operation of the host power conversion unit.

Using the principle of the single operation determining method described in Embodiment 1, a method of improving overall efficiency of the power conversion device is described with reference to the flowchart shown in FIG. 10.

The start timing of the process shown by the flowchart of FIG. 10 can be set arbitrarily. After the process is started, the load is estimated (Step ST21) using Eq. (9) or Eq. (10). If the estimated power value is smaller than a preset power threshold ("Yes" in Step ST22), the estimated value is stored (Step ST23) and then the proportional gain of the voltage adjuster 121 is changed (Step ST24). If the estimated power value is equal to or exceeds the preset power threshold ("No" in Step ST22), the process ends. The power threshold here can be set for each power conversion unit; for example, the power threshold is set for the efficiency not to fall below a given value. After changing the proportional gain of the voltage adjuster 121, the load is estimated (Step ST 25) and then difference is taken between the last estimated value and the current estimated value. If the difference is larger than the preset value ("Yes" in step ST26), the count is incremented (Step ST27); and if the difference is small and equal to or smaller than the preset value ("No" in Step ST26), the count is reset (Step ST28). In the case of incrementing the count, if the count reaches a number of determinations ("Yes" in Step ST29), the operation is determined to be parallel (Step ST30) and the power conversion operation of the relevant power conversion unit is paused (Step ST31). When the count is reset (Step ST28) or when the count does not reach the number of determinations ("No" in Step ST29) and the number of gain changes does not reach the preset upper limit ("No" in Step ST32), the process returns to Step ST23 to store the estimated value. The gain change is repeated until the operation is determined to be parallel and the power conversion operation is paused (Step ST31) or until the number of gain changes reaches the upper limit. If the number of gain changes reaches the upper limit ("Yes" in Step ST32) while the count does not reach the number of determinations, the operation is determined to be single (Step ST33). In the above process, the gain change is repeated with the gain being changed alternately to K and (K−ΔK) as described in Embodiment 1. In addition, the determination in Embodiment 2 that the operation is parallel bears the logic inversion relationship to the determination in Embodiment 1 that the operation is single. In further addition, the pause of the power conversion operation means that the relevant power conversion unit is in the zero power output state including zero proportional gain.

In the above flow, the load estimation in Step ST 21 just after the start of process requires at least the power estimation of the constant power load. However, the load estimation in the later Step ST 25 only requires at least either one of the load estimation of the constant resistive load or that of the constant power load depending on the characteristic of the load. It is noted that when the load estimation is made only for the constant resistive load in Step ST25, the load estimation is necessarily made also for the constant resistive load in Step ST21.

In the flowchart of FIG. 10, the reason why the operation is determined to be parallel (Step ST30) when the absolute value of difference between the current estimated value and the last estimated value is large (Step ST26) and when the count incremented by multiple changes of the gain reaches the number of determinations ("Yes" in Step ST29), is for preventing an error in the determination that the operation is parallel, due to a transient variation or an overlap of the process timing with that timing of the other power conversion units.

A situation is conceivable in which power consumption of the load increases after the power conversion operation of one of the power conversion units is paused and only power from the other power conversion units may become insufficient to supply. This situation entails drop of the DC bus voltage. Hence, when the DC bus voltage drops below a preset reference voltage Vout*1 lower than the target voltage Vout*, the power conversion operation of the relevant power conversion unit having paused in operation is resumed and restored again to the operating state.

When the gain is decreased at the time of changing the gain in Step ST24 of the process routine shown in FIG. 10, the DC bus voltage may in some cases drops if the power to the load is insufficient to supply. In this case, the process is aborted and the proportional gain is changed to a larger one, for example, returned to the original value, whereby the DC bus voltage can be restored to a level equal to or higher than the reference voltage Vout*1.

The process may be started at an arbitrary timing, but is preferably executed at fixed intervals. For example, unit numbers are assigned to the respective power conversion units and the process is started at periodic timings in order of the unit numbers so that the processing periods of the power conversion units are different from each other, whereby overlap between successive process timings of the power conversion units can be prevented.

Next, a specific example of improving the efficiency is described with reference to the process flowchart of FIG. 10. FIG. 12 is an example operation for improving the efficiency of a power conversion device system that is configured with two of the power conversion units: a power conversion unit A and a power conversion unit B having efficiency characteristics shown in FIG. 11. It is assumed here that the voltage adjusters 121 of the power conversion units A and B have a common proportional gain and the proportional gain is changed alternately to values of 1.0 time and 0.5 times of the design value.

Figure 11:
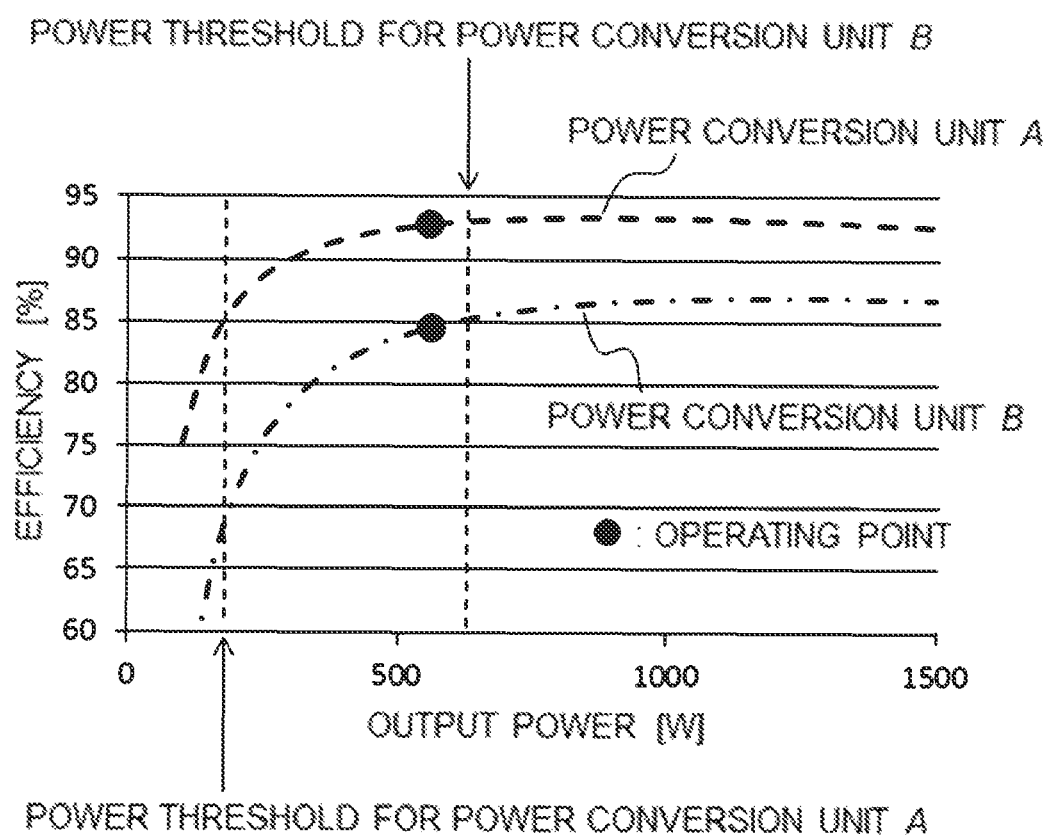
FIG. 11 is a graph showing a specific example of a characteristic of the power conversion device according to Embodiment 2.

As shown in FIG. 11, in the case of the power conversion units A and B having the common proportional gain, the respective operating points of the power conversion units are as indicated by the black circles and the respective output powers of the power conversion units are balanced at a total output power of 1,100 W. At that time, the total input to the power conversion units A and B is 1,238 W and the overall efficiency of the power conversion device is 88.9%. Since the output power of the power conversion unit B is smaller than the power threshold, the process shown in the flowchart of FIG. 10 is started.

Figure 12:
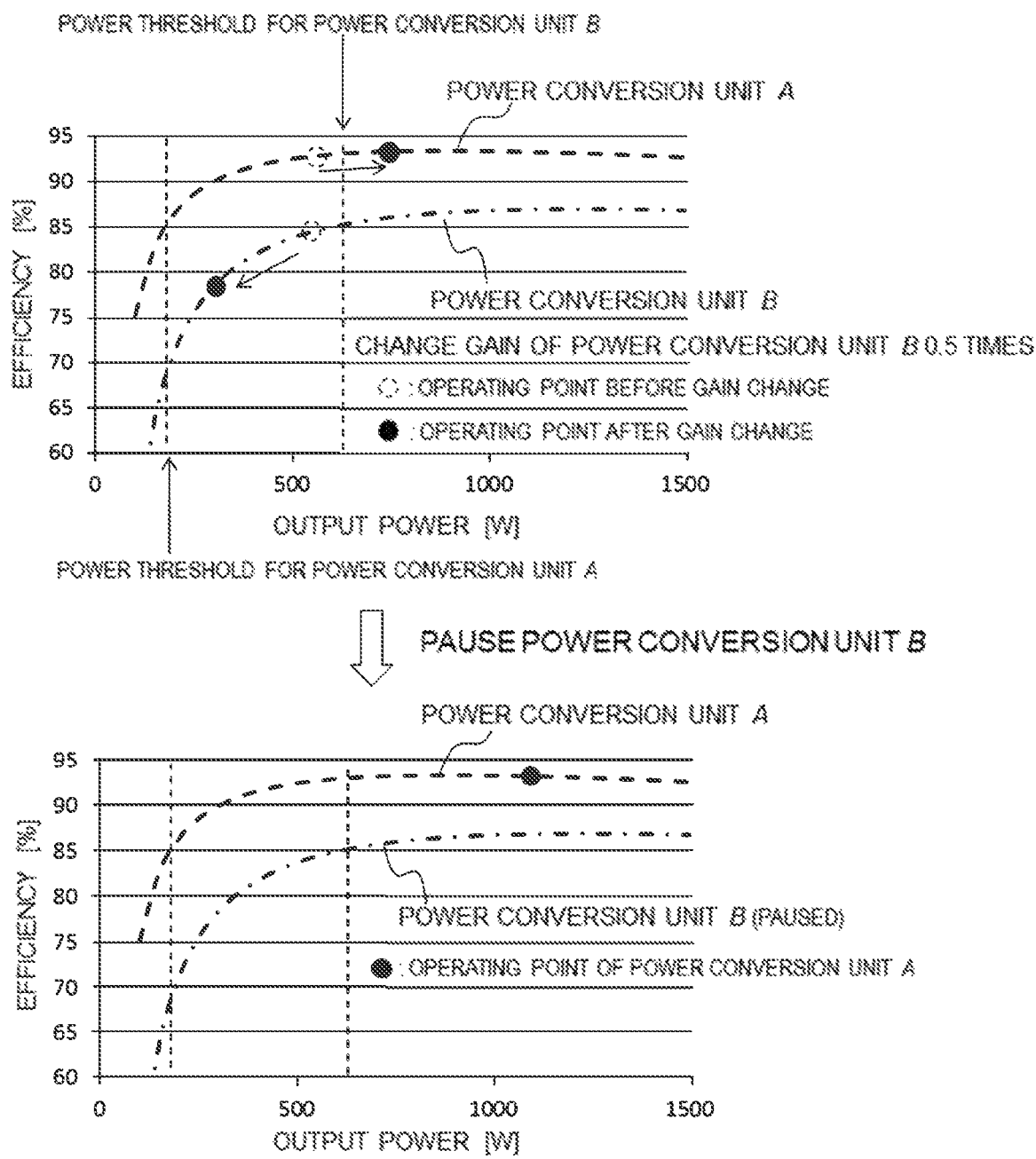
FIG. 12 shows graphs for explaining the effect of the power conversion device according to Embodiment 2.

As shown in the upper graph of FIG. 12, changing 0.5 times the proportional gain of the power conversion unit B increases the output power of the power conversion unit A and decreases the output power of the power conversion unit B. Based on the power change caused by the proportional gain change, the operation is determined to be parallel as described above, and the operation of the power conversion unit B is paused and only power conversion unit A is operated as shown in the lower graph of FIG. 12. At that time, the operating point of the power conversion unit A is shifted to the point of 1,100 W indicated by the black circle and the input becomes 1,183 W; accordingly, the efficiency is 93.0%. In this way, the overall efficiency of the power conversion device can be improved from 88.9% before the pause of power conversion unit B to 93.0% after the pause.

As described above, it is possible according to Embodiment 2 to improve the overall efficiency of the power conversion units as a whole by determining whether or not the other power conversion units are in the power conversion operations when one of the power conversion unit operates at or below its power threshold and by pausing the operation of the one power conversion unit if the other power conversion units are in the power conversion operations.

Embodiment 3

Embodiment 3 describes an efficiency improvement for a load including a power generation mechanism, such as a solar photovoltaic power generation, a wind power generation, or a hydro power generation, using the efficiency improvement method described in Embodiment 2, for the power conversion device operating the plurality of power conversion units parallelly.

Figure 13:
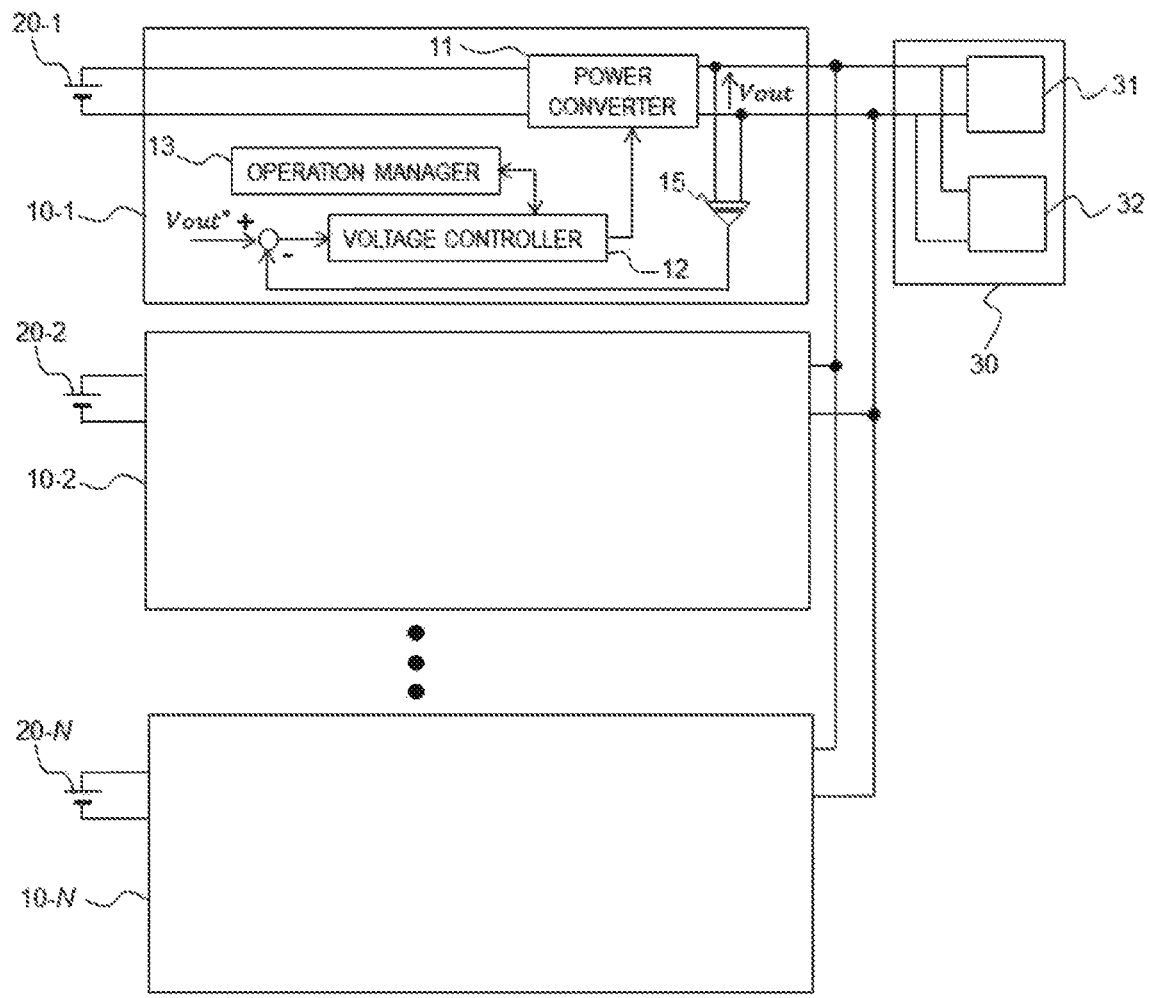
FIG. 13 is a block diagram showing a configuration of a power conversion system including the power conversion device, according to Embodiment 3.

FIG. 13 is a block diagram showing an example of a power conversion system including the power conversion device, according to Embodiment 3. Embodiment 3 and Embodiment 2 are different in that the load 30 includes a power generation mechanism 32, such as a solar photovoltaic power generation, a wind power generation, or a hydro power generation, in addition to a power consuming load 31. The power conversion units in the power conversion device according to Embodiment 3 are similar in configuration and operation to the power conversion device shown in FIGS. 1 to 12. In the following, the configuration and the operation of the power conversion units according to Embodiment 3 are described with reference to FIGS. 1 to 12 and FIG. 13 in which the load 30 shown in FIGS. 1, 2 is replace with that corresponding to Embodiment 3. Note that in the description of the operation of the power conversion unit, a description overlapped with that in Embodiment 2 is omitted and an operation associated with the difference in the configuration of the load 30 is described.

The load 30 shown in FIG. 13 configured with a power consuming load 31 and the power generation mechanism 32. The load current Iload takes a positive value when the power consumed by the power consuming load 31 is larger than the generated power of the power generation mechanism 32 and takes a negative value when the power consumed by the power consuming load 31 is smaller than the generated power of the power generation mechanism 32. When the load current is positive, the power converter 11 operates to convert the power from the power source to that to the load. When the load current is negative, on the other hand, the power converter operates 11 to convert the power from the load to that to the power source. In other words, the power converter 11 connected between the power source and the load is able to perform power conversion from the power source to the load and also from the load to the power source, i.e., operates as a bidirectional power converter. The negative state of the load current Iload means that the actual voltage Vout is higher than the target voltage Vout* because a power is supplied to the power conversion units from the load 30; hence, the estimated resistance value Rx and the estimated power value Px expressed by Eqs. (9), (10) take negative values. When a power is supplied to the power conversion units from the load 30, the power conversion units to which the power is supplied returns the power to the power source, for example, to charge a storage battery connected to the power source. The efficiency improvement method described in Embodiment 2 is likewise applicable to the configuration of Embodiment 3 because the operation is determined to be parallel on the basis of the absolute value of the difference between the estimated values Rx or between the estimated values Px before and after the proportional gain is changed (Step ST26 in FIG. 10).

In the negative state of the load current Iload, a situation is conceivable in which the generated power of the generation mechanism 32 in the load increases after one of the power conversion units pauses in operation and the generated power becomes too much for only power conversion units other than that paused in operation to charge. This situation entails further increase of the DC bus voltage. Hence, when the DC bus voltage exceeds a preset reference voltage Vout*2 higher than the target voltage Vout*, the power conversion operation of the relevant power conversion unit having paused in operation is resumed and restored again to the operating state. In addition, since rise of the DC bus voltage above the target voltage Vout* occurs only in the case of including the power generation mechanism in the load, there is no need to monitor the direction of the load current. The only need is to monitor the DC bus voltage.

When the gain is decreased at the time of changing the gain in Step ST24 of the process routine shown in FIG. 10, the DC bus voltage may in some cases exceed the reference voltage Vout*2 if the generated power of the load is too much to charge. In this case, the process is aborted and the proportional gain is changed to a larger one, for example, returned to the original value, whereby the DC bus voltage can be restored to a level equal to or lower than the reference voltage Vout*2. In other words, by setting lower than the target voltage of the voltage controller 12 the reference voltage Vout*1, which is described in Embodiment 2, for releasing a pause of the operation at an overload and by setting higher than the target voltage of the voltage controller 12 the reference voltage Vout*2, which is described above, for releasing a pause of the operation at an overgeneration, the DC bus voltage can be always kept between the reference voltage Vout*1 and the reference voltage Vout*2, thus being able to implement a stable operation capable of the bidirectional power transfer.

It should be noted that each embodiment may be combined or appropriately modified or omitted.

REFERENCE NUMERALS 10, 10-1, 10-2, . . . , 10-N: power conversion unit;
11: power converter;
12: voltage controller;
13: operation manager;
15: voltage sensor;
20-1, 20-2, . . . , 20-N: DC power source;
21-1, 21-2, . . . , 21-N: AC power source;
30: load;
31: power consuming load;
32: power generation mechanism; and
121: voltage adjuster.

The invention claimed is:

1. A power conversion device comprising:
a plurality of power conversion units configured in parallel and connected a load, each power conversion unit having:
a power converter configured to convert a power from a power source to a DC power for the load; and
a voltage controller provided with a voltage adjuster configured to receive a steady-state offset between a target voltage and a voltage output to the load from the power converter, to perform a proportional control for controlling the voltage to the target voltage,
wherein at least one of the plurality of power conversion units has an operation manager configured to manage an operation of the at least one power conversion unit, and the operation manager changes a proportional gain for the proportional control of the voltage adjuster of the at least one power conversion unit to determine whether or not the at least one power conversion unit is in a single operation in which other of the plurality of power conversion units except for the at least one power conversion unit are not in operation, by comparing a change in the steady-state offset with a change in the proportional gain.

2. The power conversion device of claim 1, wherein the change in the steady-state offset is compared with the change in the proportional gain by calculating, using the voltage to the load and a target current value output from the voltage adjuster, estimated resistance values or estimated power values of the load before and after the proportional gain is changed.

3. The power conversion device of claim 2, wherein at least two of the plurality of power conversion units each has the operation manager, and individual identification numbers are respectively assigned to the at least two power conversion units to differentiate, for each identification number, timings of starting a process of changing the proportional gain to determine whether or not one of the at least two power conversion units is in the single operation.

4. The power conversion device of claim 3, wherein the operation manager of the at least one power conversion unit pauses a power conversion operation of the at least one power conversion unit when determines the at least one power conversion unit to be not in the single operation but in a parallel operation with the other of the plurality of power conversion units when a power from the at least one power conversion unit is equal to or smaller than a preset power threshold for the at least one power conversion unit.

5. The power conversion device of claim 2, wherein the operation manager of the at least one power conversion unit pauses a power conversion operation of the at least one power conversion unit when determines the at least one power conversion unit to be not in the single operation but in a parallel operation with the other of the plurality of power conversion units when a power from is equal to or smaller than a preset power threshold for the at least one power conversion unit.

6. The power conversion device of claim 1, wherein at least two of the plurality of power conversion units each has the operation manager, and individual identification numbers are respectively assigned to the at least two power conversion units to differentiate, for each identification number, timings of starting a process of changing the proportional gain to determine whether or not one of the at least two power conversion units is in the single operation.

7. The power conversion device of claim 6, wherein the operation manager of the at least one power conversion unit pauses a power conversion operation of the at least one power conversion unit when determines the at least one power conversion unit to be not in the single operation but in a parallel operation with the other of the plurality of power conversion units when a power from the at least one power conversion unit is equal to or smaller than a preset power threshold for the at least one power conversion unit.

8. The power conversion device of claim 1, wherein the operation manager of the at least one power conversion unit pauses a power conversion operation of the at least one power conversion unit when determines the at least one power conversion unit to be not in the single operation but in a parallel operation with the other of the plurality of power conversion units when a power from the at least one power conversion unit is equal to or smaller than a preset power threshold for the at least one power conversion unit.

9. The power conversion device of claim 8, wherein the operation manager of the at least one power conversion unit starts the power conversion operation of the at least one power conversion unit when the voltage to the load becomes equal to or lower than a preset reference voltage lower than the target voltage after the power conversion operation of the at least one power conversion unit is paused.

10. The power conversion device of claim 8, wherein the operation manager of the at least one power conversion unit starts the power conversion operation of the at least one power conversion unit when the voltage to the load becomes equal to or higher than a preset reference voltage higher than the target voltage after the power conversion operation of the at least one power conversion unit is paused.

11. A power conversion system comprising:
the power conversion device recited in claim 10 and a load including a power generation mechanism connected to the power conversion device.

12. A method of operating a power conversion device that has a plurality of power conversion units configured in parallel and connected to a load, and each power conversion unit includes a power converter connected between a power source and the load and is configured to convert a power from the power source to a DC power for the load; and a voltage controller provided with a voltage adjuster configured to receive a steady-state offset between a target voltage and a voltage output to the load from the power converter, to perform a proportional control for controlling the voltage to the load to the target voltage, the method of operating the power conversion device comprising steps of:
determining whether or not other of the plurality of power conversion units except for at least one of the plurality of power conversion units are in a parallel operation with the at least one power conversion unit, by changing a proportional gain of the proportional control of the voltage adjuster of the at least one power conversion unit and by comparing a change in the steady-state offset with the change in the proportional gain; and
pausing a power conversion operation of the at least one power conversion unit when the power supplied to the load from the at least one power conversion unit is equal to or smaller than a preset power threshold for the at least one power conversion unit and when the other of the plurality of power conversion units are determined to be in the parallel operation with the at least one power conversion unit.

13. The method of operating the power conversion device of claim 12 further comprising: a step of starting the power conversion operation of the at least one power conversion unit when the voltage to the load becomes equal to or lower than a preset reference voltage lower than the target voltage after the power conversion operation of the at least one power conversion unit is paused.

14. The method of operating the power conversion device of claim 12 further comprising: a step of starting the power conversion operation of the at least one power conversion unit when the voltage to the load becomes equal to or higher than a preset reference voltage higher than the target voltage after the power conversion operation of the at least one power conversion unit is paused.

* * * * *